United States Patent [19]

Wager

[11] Patent Number: 4,622,138

[45] Date of Patent: Nov. 11, 1986

[54] VERTICAL DRAIN

[76] Inventor: Oleg Wager, Koltrastvagen 43, S-161 37 Bromma, Sweden

[21] Appl. No.: 678,337

[22] Filed: Dec. 5, 1984

[30] Foreign Application Priority Data

Mar. 9, 1984 [SE] Sweden ............................ 8401322

[51] Int. Cl.[4] ...................... B01D 29/04; E02B 11/00
[52] U.S. Cl. .................................. 210/170; 210/486; 210/498; 405/45; 405/50
[58] Field of Search .............. 210/170, 486, 487, 924, 210/498; 405/45, 50; 52/169.5

[56] References Cited

U.S. PATENT DOCUMENTS

| 2,201,628 | 5/1940 | McCormick | 210/486 |
|---|---|---|---|
| 3,263,819 | 8/1966 | Schmidt | 210/498 |
| 3,358,843 | 12/1967 | Bourdale | 210/487 |
| 3,441,140 | 4/1969 | Thurber | 210/170 |
| 3,654,765 | 4/1972 | Healy | 405/45 |
| 3,679,058 | 7/1972 | Smith | 210/924 |
| 3,803,777 | 4/1974 | Stewart | 52/169.5 |
| 3,965,686 | 6/1976 | Saito | 210/486 |
| 4,057,500 | 11/1977 | Wager | 210/486 |

FOREIGN PATENT DOCUMENTS

| 2817252 | 11/1978 | Fed. Rep. of Germany | 405/50 |
|---|---|---|---|
| 2025483 | 1/1980 | United Kingdom | 405/50 |
| 2040655 | 9/1980 | United Kingdom | 405/50 |
| 597775 | 3/1978 | U.S.S.R. | 405/50 |

Primary Examiner—Ernest G. Therkorn
Attorney, Agent, or Firm—Louis Bernat

[57] ABSTRACT

A vertical drain for dewatering saturated, compressible soils. When stored and delivered the drain has a rectangular cross section and can be rolled on reels, but since the drain can be folded longitudinally the drain, when installed in the soil will expose not less than two sides in angle to each other towards the radial flow of water to the drain.

Each side consists of a band-formed core (2) with longitudinal and perpendicular channels (4 and 5) shaped by ridges (3) which are cut on certain distances and surrounded by a filter fabric (1).

3 Claims, 9 Drawing Figures

A—A

A—A

VERTICAL DRAIN

BACKGROUND OF THE INVENTION

This invention constitutes of a vertical drain to dewater saturated, compressible soils.

A structure, e.g. a building or a road brings a load on the ground. If the ground consists of saturated fine soil, clay, silt or organic soil, the load to start with will mainly be taken up by the pore water in the soil. The pore water pressure will increase and the pore water will start to flow. The water will find the shortest way to a draining stratum or layer. Underneath the loaded area the degree of saturation will decrease and simultaneously the pore over-pressure. Simplified, the stress of the load will finally be taken up by the soil particles. The flow of pore water will cease.

The decrease of pore water will be noted as a settlement of the ground surface. The settlement under a given area will roughly be equal to the volume of water squeezed out, divided with the surface area. The settlement of a structure foundated on 10-20 m of clay can often reach 1 m and more. Since fine soils have a low permeability the settlement can go on for a long time, 50-100 years, depending upon the geological conditions.

Through installation of vertical drains in the soil the time to reach a certain settlement can however be significantly shortend. The procedure is as follows. By means of a mandrel a number of drains are installed in the area of the structure. The mandrel protects the drain during the installation. When the desired depths is reached the mandrel is withdrawn, while the drain remains in the soil. After that the drains have been installed a surcharge, slightly heavier than the weight of the structure, is applied. When the estimated settlement for the structure has been reached, the surcharge is removed, and the structure can be erected. The drain spacing, often 1-2 m, is usually choosen so that the desired settlement will be reached within 1-2 years, depending upon the actual conditions.

As far as known the idea of vertical drainage originated with D. E. Moran in the U.S.A. in the 1920's. Moran proposed that vertical sand columns should be installed in the ground.

In the mid 1930's Walter Kjellman, Sweden, proposed the likely first prefabricated band-shaped drain Swedish Pat. Nos. 102.311 and 121.887. It was made of cardboard, had a width of 100 mm and a thickness of 4 mm. In the longitudinal direction the drain had 6-10 channels through which the water could flow to the ground surface and/or to a drained bottom layer.

After the Second World War with the development of the plastic industri, a number of plastic drains came on the market. The majority have a rectangular cross section, but even drains with a cirkular section are available.

The time to achieve a given degree of consolidation with a given drain spacing and cross section on the drains can be calculated by means of a formula developed by for instance Kjellman.

$$t = \frac{D^2}{8 c_h} \left[ \ln\left(\frac{D}{d}\right) - \frac{3}{4} \right] \ln\frac{1}{1-U}$$

t = time
D = area influenced by one drain
d = drain diameter, equivalent diameter
$c_h$ = coefficient of consolidation, a function of the horizontal permeability in the soil
U = degree of consolidation in percent An important measure of the effectiveness of a drain is the drain diameter (d), referred to a circular drain. For a rectangular drain the drain diameter will be the perimeter of the filter wrapping divided by $\pi$. It can be seen that the capacity of the drain will increase with an increased perimeter.

SUMMARY OF THE INVENTION

The drain presented here constitutes a drain which can be folded straight across longitudinally and so expose at least two sides in an angle to each other (FIGS. 1, 2, 4, 5, 7, 8) when installed in the soil, to catch the radial flow of water to the drain. When stored and delivered the drain has a rectangular cross section and can be delivered in rolls (FIGS. 3, 6, 9).

DESCRIPTION OF THE PREFERRED EMBODIMENTS

Figure 1:
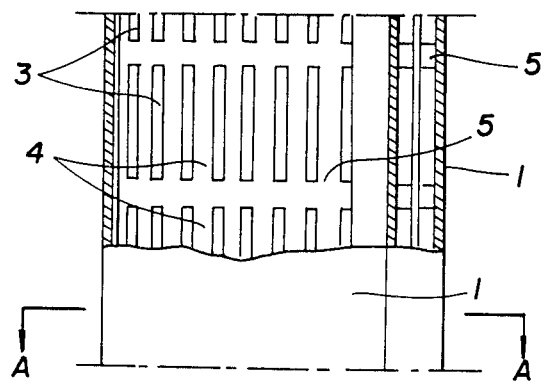
FIG. 1 shows a drain that consists of two band-formed plastic cores.
Figure 2:
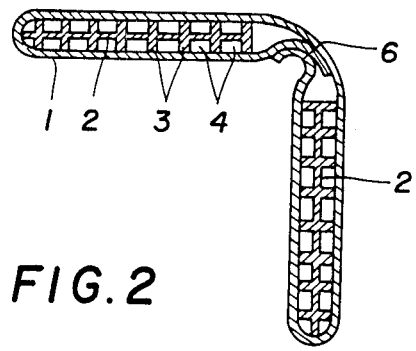
FIG. 2 shows a cross-sectional view of FIG. 1 along line A—A.
Figure 3:
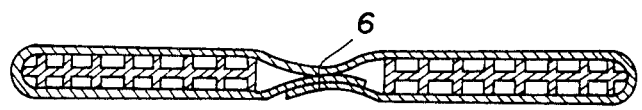
FIG. 3 shows the device of FIG. 1 in storage position.

In the shape as shown on FIGS. 1-3, the drain consists of two band-formed plastic cores (2) surrounded by a filter (1). Each core has on both sides ridges (3), forming longitudinal channels (4). At certain distances the ridges are interrupted so that perpendicular channels to the longitudinal ones are formed (5). Thanks to the perpendicular channels the drain will be easy to roll. By sewing or needle-punching the filter fabric (6), the two cores are kept separated from each other.

Figure 4:
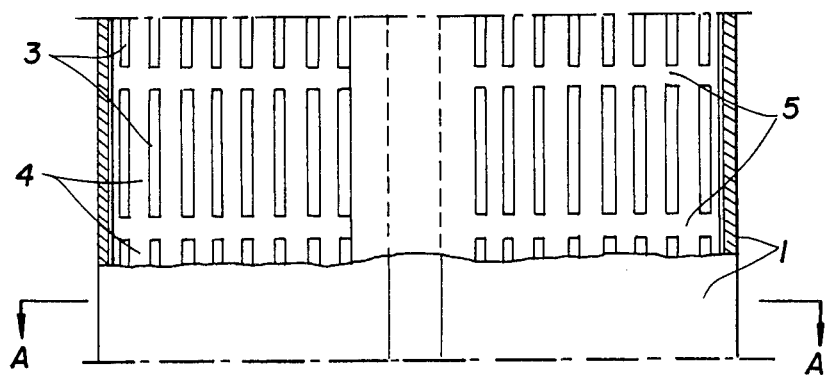
FIG. 4 shows a cross shaped drain formed by connecting two of the devices of FIG. 1.
Figure 5:
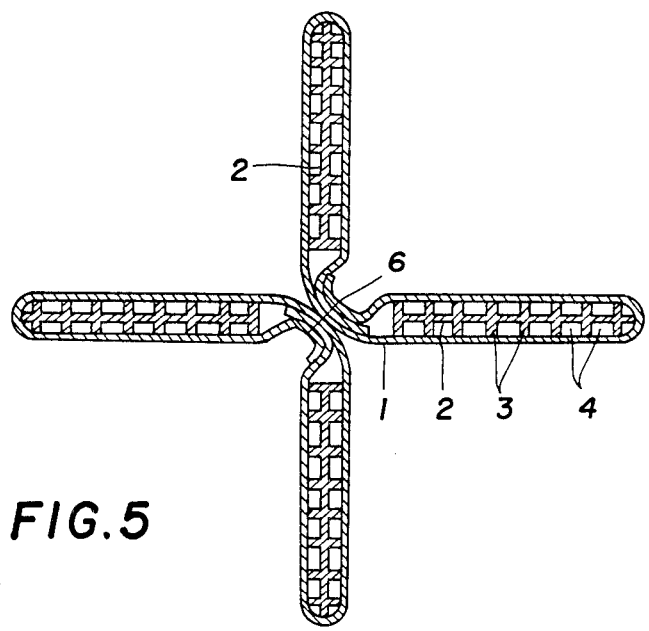
FIG. 5 shows a cross-sectional view of FIG. 4 in storage along line A—A.
Figure 6:
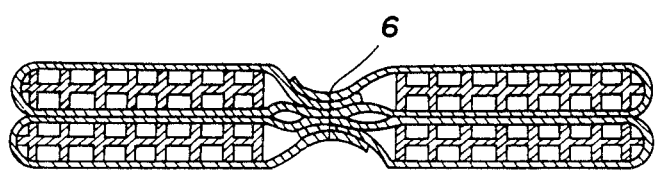
FIG. 6 shows the device of FIG. 4 in storage position.

FIGS. 4 and 5 is a cross shaped drain, formed by connection (6) of two drains (6) according to FIGS. 1-3.

Figure 7:
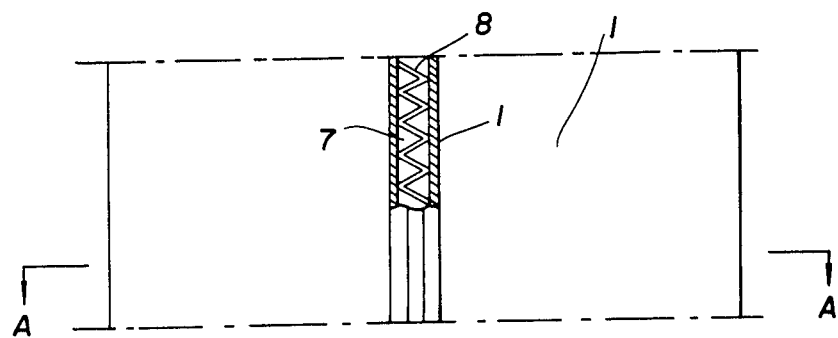
FIG. 7 shows across shaped drain with a central pipe.
Figure 8:
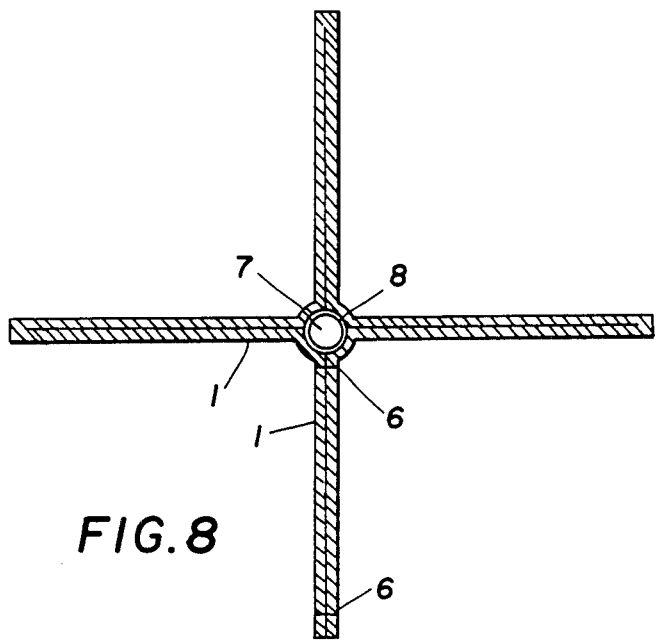
FIG. 8 shows a cross-sectional view of FIG. 7 along with A—A.
Figure 9:
FIG. 9 shows the device of FIG. 7 in storage position.

FIGS. 7-8 shows a cross shaped drain made of fabric (1) wrapping a spiral (8) so that a central pipe is formed. If the sides of the cross are formed through a folded fabric, the fabric of the sides can either be sewed or needle punched (6).

The drawings present the drain in scale 1:1, standard manufactured. For special purposes it might be desirable to change some dimensions like the instance the diameter of the central pipe (7, FIGS. 7, 8), which may be increased. The dimensions shown are choosen to make it possible to use a mandrel with an inner diameter of 100 mm, which has become a universal standard.

The drain is preferably delivered with a rectangular section in rolls. The angular position of the sides is done in connection with the installation. To the lower end of the mandrel or casing a nozzle, 0.5–1 m long, is attached. The cross section of the nozzle is the same as the cross section wanted on the drain installed. For a cross formed section, a cross formed shape on the nozzle is used. The drain is pushed through the nozzle and the end of the drain is attached to a square steel- or plastic plate. The length of the diagonal of the plate should not exceed the outer diameter of the casings cuplings. The bottom plate will, at the same time as it keeps the drain in position, prevent soil to enter into the nozzle. When the desired depth has been reached the casing is withdrawn. Since the area of the plate is larger than the area of the nozzle, the bottomplate will be kept in the soil which will surround the drain and so preserve the desired cross section of the drain in the soil. The upper part of the nozzle should be smoothly rounded at the drains entrance into the channels of the nozzle to prevent damage of the drain.

Numbers on drawings refer to:
1—Filter fabric, non-woven
2—Band shaped core
3—Longitudinal ridge
4—Longitudinal channel
5—Perpendicular channel
6—Sewed or needle-punched
7—Central pipe
8—Spiral

I claim:

1. A prefabricated vertical drain for dewatering saturated soil, said drain comprising two elongated bands joined to open and form at least a partial cross-shaped cross section, each of said bands having a core covered by a filter fabric, each of said cores having a plurality of longitudinal channels intersected by transverse channels extending perpendicular thereto, the fabric of said two bands being longitudinally joined together so that said bands may be folded together or spread apart, said spread bands being shaped so that they may be installed with at least two sides set an an angle to catch water flowing radially into the drain, said bands folded together having a rectangular cross section so that they may be rolled up for storage.

2. The drain of claim 1 wherein there are four of said bands which are longitudinally formed together so that they may be opened to form a full cross in cross section.

3. The drain of claim 1 or 2 wherein said bands are joined to a central pipe extending in said longitudinal direction, said central pipe being formed by a spiral member covered by a fabric material.

* * * * *